United States Patent
Wachtler

(10) Patent No.: US 11,549,075 B2
(45) Date of Patent: Jan. 10, 2023

(54) BENZYL HEMIFORMAL-CONTAINING BIODIESEL MIXTURES

(71) Applicant: LANXESS Deutschland GmbH, Cologne (DE)

(72) Inventor: Peter Wachtler, Krefeld (DE)

(73) Assignee: LANXESS Deutschland GmbH, Cologne (DE)

(*) Notice: Subject to any disclaimer, the term of this patent is extended or adjusted under 35 U.S.C. 154(b) by 0 days.

(21) Appl. No.: 17/430,159

(22) PCT Filed: Feb. 10, 2020

(86) PCT No.: PCT/EP2020/053325
§ 371 (c)(1),
(2) Date: Aug. 11, 2021

(87) PCT Pub. No.: WO2020/165092
PCT Pub. Date: Aug. 20, 2020

(65) Prior Publication Data
US 2022/0145197 A1    May 12, 2022

(30) Foreign Application Priority Data
Feb. 12, 2019  (EP) .................. 19156568

(51) Int. Cl.
*C10L 1/18*   (2006.01)
*C10L 1/185*  (2006.01)

(52) U.S. Cl.
CPC ...... *C10L 1/1852* (2013.01); *C10L 2200/0476* (2013.01); *C10L 2230/083* (2013.01); *C10L 2230/14* (2013.01)

(58) Field of Classification Search
CPC ............. C10L 1/1852; C10L 2230/14; C10L 2230/083; C10L 2200/0476
See application file for complete search history.

(56) References Cited

U.S. PATENT DOCUMENTS

| 2019/0071378 A1* | 3/2019 | Visser ............... B01J 19/245 |
| 2020/0157444 A1* | 5/2020 | Bodas ............... C07C 41/56 |

FOREIGN PATENT DOCUMENTS

| WO | 04040979 A1 | 5/2004 |
| ZA | 8409811 A   | 8/1985 |

OTHER PUBLICATIONS

Fregolente et al. Water Content in Biodiesel, Diesel, and Biodiesel-Diesel Blends, J of Chemical and Engineering Data 2012, 57, 1817-1821; 2012.*
International Search Report from corresponding International Application No. PCT/EP2020/053325, dated Apr. 1, 2020, three pages.
XP055603756, Lanxess "Preventol D2 Produkt-lnformation", Mar. 28, 2011, retrieved from the Internet on Jul. 9, 2019, www.//prechel-gmbh.de/pdf/Biozide/Preventol_D_2.pdf, 7 pages.
European Search Report from corresponding European Application No. 19156568, dated Jul. 11, 2019, two pages.

* cited by examiner

*Primary Examiner* — Cephia D Toomer
(74) *Attorney, Agent, or Firm* — Nicanor A. Kohncke; Christopher L. McDavid; Ewa M. Wozniak

(57) ABSTRACT

A mixture comprising
 a) biodiesel, and
 b) 10% to 60% by weight, in particular 15% to 40% by weight, of benzyl hemiformal.

9 Claims, No Drawings

BENZYL HEMIFORMAL-CONTAINING BIODIESEL MIXTURES

The invention relates to benzyl hemiformal-containing biodiesel mixtures, to a process for producing same, to the use of same for the stabilization of diesel fuels against microorganisms and also to corresponding stabilized diesel fuels.

Since the use of biodiesel has gained increasing significance in recent times as a legally stipulated additive in diesel fuels for automobiles, recent years have also correspondingly seen a growing rise in the production and marketing of petrodiesel admixed with biodiesel, known as B5, B10 or B20 diesel fuels, the appended number representing the biodiesel content in % by volume. A particular disadvantage of the B5-B20 diesel fuels compared to conventional, purely petrochemical-based diesel fuel is the reduced microbiological storage stability of these mixtures, since in comparison to petrodiesel these diesel fuels can be attacked more easily by microorganisms and consequently undesirable phenomena such as slime formation or fungal growth can occur. The biomass excreted as a result of microorganism growth can then for example clog filters of pumps or engines and result in stoppages and machine downtimes and possibly expensive repairs. Excreted metabolic products such as acids can also corrode sensitive components such as injection systems, pumps and nozzles of diesel engines. This considerably limits the functionality, service life and performance of the diesel engine. None of these metabolites should be present in B5-B20 diesel fuels.

The use of the alternative energy source biodiesel from renewable raw materials as a constituent in diesel fuels for automobiles thus makes an increase in the microbiological storage stability, especially of B5-B20 diesel fuels, absolutely necessary.

In contrast to the described use of BHF in biodiesel, it proves to be more difficult to add BHF to conventional diesel fuel which comprises petrodiesel with typically no more than 7% by volume of biodiesel. While BHF mixtures with BIT (1,2-benzisothiazolinone) are already mentioned in WO2004/0400979 also for use in petrodiesel, at room temperature BHF is a liquid which is only poorly soluble in petrodiesel. Attempts to incorporate BHF into petrodiesel have found that the solubility of BHF in petrodiesel is markedly lower than the solubility of BHF in biodiesel. Sufficient protection is therefore not always guaranteed with the achievable solubilities.

This also applies to the B5 to B20 diesel fuels described above, even though these already comprise biodiesel.

An object of the present invention was therefore that of finding a process which enables the incorporation of BHF into diesel fuels, so that this too is protected to a sufficient degree against attack from harmful microorganisms such as bacteria, mold or yeasts. It has now been found that BHF can be more easily incorporated into diesel fuels when a BHF/biodiesel mixture is used for this purpose.

The invention therefore relates to a mixture comprising
a) biodiesel, and
b) 10% to 60% by weight, in particular 15% to 40% by weight, of benzyl hemiformal.

Component a)

"Biodiesel" is understood to mean in particular all saturated and unsaturated fatty acids, fatty acid alkyl esters, in particular fatty acid methyl esters (FAME), which can be used as biodiesel, as are typically sold under the term biodiesel for use as fuel in automobiles. Biodiesel can additionally comprise all customary additives, for example as are added for increasing the winter stability of biodiesel. Preferred biodiesel comprises at least 96.5% by weight of fatty acid methyl ester. Preferred biodiesel has a flash point of at least 101° C.

The mixture according to the invention in particular comprises biodiesel in an amount of 40% to 90% by weight, in particular of 60% to 85% by weight. The mixture according to the invention preferably comprises components a) and b) in an amount of 99-100% by weight, based on the mixture according to the invention.

Component b)

"Benzyl hemiformal", also abbreviated to "BHF", is understood to mean the biocidal active agent of formula (I).

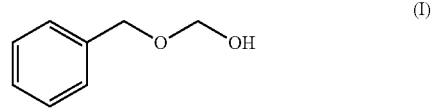

(I)

The mixture according to the invention preferably comprises, as biocide, benzyl hemiformal in an amount of more than 95% by weight, in particular more than 99% by weight, based on the total amount of biocide in the mixture according to the invention. Very particularly preferably, the mixture according to the invention comprises benzyl hemiformal as the sole biocide.

Production

The invention further relates to a process for producing the mixture according to the invention, characterized in that benzyl hemiformal is dissolved in biodiesel. This preferably involves mixing the benzyl hemiformal with biodiesel at a temperature of 20 to 30° C. with stirring. The preferred ranges specified for the mixture otherwise also apply to the process.

Use

The invention also relates to the use of the mixture according to the invention for the stabilization of diesel fuels against microorganisms.

Diesel fuel is preferably understood to be a petrodiesel-containing fuel which can comprise up to 26% by weight, preferably from 0 to 20% by weight, in particular from 1% to 9% by weight, particularly preferably from 2% to 9% by weight of biodiesel. In a low-biodiesel alternative, the diesel fuel preferably comprises a petrodiesel-containing fuel with less than 2% by weight, in particular less than 1% by weight, very particularly preferably less than 0.5% by weight of biodiesel.

"Petrodiesel" is understood to mean, in particular, all grades produced from hydrocarbons in crude oil, especially those which boil in the range from 170 to 390° C. The petrodiesel preferably meets the specification according to DIN EN 590. The petrodiesel preferably has a cetane number of >51. In particular, the petrodiesel consists of $C_9$-$C_{22}$ hydrocarbons.

The mixture according to the invention is preferably added to the diesel fuel to be stabilized in an amount of 0.005% to 10% by weight, preferably 0.05% to 5% by weight, particularly preferably 0.05% to 2.0% by weight, based on the amount of stabilized diesel fuel. Compared to non-stabilized diesel fuel, the diesel fuel stabilized with BHF in accordance with the invention provides a considerable contribution to making the B5-B20 diesel fuels produced therefrom more stable against attack by microorganisms during distribution and storage and in filling stations over a relatively long period. The BHF is present dissolved in the stabilized diesel fuel.

For the stabilization, the mixture according to the invention is preferably mixed with the diesel fuel, in particular the mixture is used here in an amount such that the amount of benzyl hemiformal is at least 0.02% by weight, in particular at least 0.03% by weight, preferably from 0.02% to 0.2% by weight, especially from 0.03% to 0.2% by weight, based on the diesel fuel.

If it does not yet contain any biodiesel contents, biodiesel can also be added to the diesel fuel before or preferably after the addition of the mixture according to the invention.

Surprisingly, even after a relatively long period, no separation of BHF can be observed after incorporation in the diesel fuel to be protected.

Diesel Fuel

The invention further relates to a diesel fuel comprising
i) at least 200 ppm, in particular at least 0.03% by weight, of benzyl hemiformal and
ii) 0.18% to 26% by weight, in particular 0.27% to 26% by weight, preferably to 20% by weight, especially from 1% to 9% by weight, particularly preferably from 2% to 9% by weight of biodiesel.

The diesel fuel according to the invention preferably comprises at least 0.02% to 0.2% by weight, in particular 0.03% to 0.2% by weight of benzyl hemiformal.

The diesel fuel according to the invention preferably comprises, as biocide, benzyl hemiformal in an amount of at least 95% by weight, in particular of at least 99% by weight, based on the total amount of biocide.

In particular, the diesel fuel according to the invention comprises petrodiesel and biodiesel in a total amount of greater than 98% by weight, based on the diesel fuel, and preferably it comprises petrodiesel, biodiesel and benzyl hemiformal in a total amount of greater than 99% by weight, based on the diesel fuel.

The invention further relates to a diesel fuel comprising the mixture according to the invention, wherein the content of benzyl hemiformal is 0.02% to 0.2% by weight and the content of biodiesel is less than or equal to 1.8% by weight, based in each case on the diesel fuel.

EXAMPLES

1) Benzyl Hemiformal—Solubility in Petrodiesel without Biodiesel Content

While stirring, BHF was mixed with petrodiesel in 0.01% steps. The following solubilities of BHF in petrodiesel were determined:

TABLE 1

Solubility of benzyl hemiformal in petrodiesel 100%

| [%] BHF | |
|---|---|
| 0.01 | dissolved to give clear solution |
| 0.02 | dissolved to give clear solution |
| 0.03 | undissolved fractions |
| 0.04 | undissolved fractions |

As can be seen from the table, BHF in undiluted state can be incorporated into petrodiesel in an amount of up to approx. 200 ppm to give a clear solution. When adding larger amounts, droplets of undissolved benzyl hemiformal can be observed which had still not dissolved even after several hours. If greater amounts of BHF are intended to be rapidly incorporated into petrodiesel, as can be the case in the event of an acute attack from microorganisms, this type of incorporation is therefore unsuitable in practice.

2) Benzyl Hemiformal—Solubility in B7 Diesel Fuel (Petrodiesel with 7% by Volume of Biodiesel)

TABLE 2

Solubility of benzyl hemiformal in B7 diesel fuel

| [%] BHF | |
|---|---|
| 0.01 | dissolved to give clear solution |
| 0.02 | dissolved to give clear solution |
| 0.03 | undissolved fractions |
| 0.04 | undissolved fractions |

As can be seen from the table, BHF in undiluted state can be incorporated into B7 diesel fuel in an amount of up to approx. 200 ppm to give a clear solution. When adding larger amounts, droplets of undissolved benzyl hemiformal can be observed which had still not dissolved even after several hours. If greater amounts of BHF are intended to be incorporated into the diesel fuel, as can be the case in the event of an acute attack from microorganisms, this type of incorporation is therefore unsuitable in practice.

3) Benzyl Hemiformal Stock Solution in Biodiesel—Solubility in Petrodiesel

A 20% BHF stock solution in biodiesel was mixed with petrodiesel (without biodiesel) in 0.05% steps while stirring. The following solubilities were determined:

TABLE 3

Solubility of a BHF stock solution (20%) in petrodiesel without biodiesel content

| Addition of BHF stock solution [%] | BHF in petrodiesel [%] | |
|---|---|---|
| 0.05 | 0.01 | dissolved to give clear solution |
| 0.10 | 0.02 | dissolved to give clear solution |
| 0.25 | 0.05 | dissolved to give clear solution |
| 0.5 | 0.1 | dissolved to give clear solution |
| 1.0 | 0.2 | dissolved to give clear solution |

As can be seen from the table, the BHF stock solution can be incorporated into petrodiesel in a manner well-dissolved in a clear solution in such amounts that, as a result, significantly greater amounts of pure BHF are present in the petrodiesel than would be possible when incorporating pure BHF.

In this way it is possible to incorporate such amounts of BHF into petrodiesel that fuels which have already been attacked can be efficiently treated thereby. Furthermore, larger amounts of BHF can be incorporated as a precaution into petrodiesels in which there is expectation of a relatively longer storage time of the fuel.

A similar result could also be achieved by incorporation of the above stock solution into the B7 diesel fuel.

What is claimed is:
1. A mixture comprising
a) 40% to 90% by weight biodiesel, and
b) 10% to 60% by weight of benzyl hemiformal.

2. The mixture according to claim 1, wherein the components a) and b) are present in an amount of 99-100% by weight based on the mixture.

3. The mixture according to claim 1, comprising, as biocide, benzyl hemiformal in an amount of more than 95% by weight based on the total amount of biocide in the mixture.

4. A process for producing the mixture according to claim 1, comprising dissolving the benzyl hemiformal in the biodiesel.

5. A process for the stabilization of diesel fuel against microorganisms comprising contacting the diesel fuel with the mixture according to claim 1.

6. The process according to claim 5, wherein the diesel fuel has a biodiesel content of up to 26% by weight.

7. The process according to claim 5, wherein the diesel fuel has a biodiesel content of with less than 2% by weight.

8. A diesel fuel comprising
   i) at least 200 ppm of benzyl hemiformal and
   ii) 0.18% to 26% by weight of biodiesel.

9. The diesel fuel according to claim 8, wherein the content of benzyl hemiformal is 0.02% to 0.2% by weight and the content of biodiesel is less than or equal to 1.8% by weight, based in each case on the diesel fuel.

* * * * *